US012804218B2

(12) United States Patent
Stone

(10) Patent No.: US 12,804,218 B2
(45) **Date of Patent: *Nov. 17, 2026**

(54) METHODS AND SYSTEMS FOR SYNCHRONIZATION OF CLOSED CAPTIONS WITH CONTENT OUTPUT

(71) Applicant: Comcast Cable Communications, LLC, Philadelphia, PA (US)

(72) Inventor: Christopher Stone, Newtown, PA (US)

(73) Assignee: Comcast Cable Communications, LLC, Philadelphia, PA (US)

(*) Notice: Subject to any disclaimer, the term of this patent is extended or adjusted under 35 U.S.C. 154(b) by 0 days.

This patent is subject to a terminal disclaimer.

(21) Appl. No.: 19/088,528

(22) Filed: Mar. 24, 2025

(65) Prior Publication Data

US 2025/0227320 A1 Jul. 10, 2025

Related U.S. Application Data

(63) Continuation of application No. 18/462,117, filed on Sep. 6, 2023, now Pat. No. 12,273,582, which is a continuation of application No. 17/698,570, filed on Mar. 18, 2022, now Pat. No. 11,785,278.

(51) Int. Cl.

*H04N 21/43* (2011.01)
*H04N 21/44* (2011.01)
*H04N 21/488* (2011.01)
*H04N 21/8547* (2011.01)

(52) U.S. Cl.

CPC . *H04N 21/43074* (2020.08); *H04N 21/44004* (2013.01); *H04N 21/4884* (2013.01); *H04N 21/8547* (2013.01)

(58) Field of Classification Search

CPC ....... H04N 21/43074; H04N 21/44004; H04N 21/44008; H04N 21/440236; H04N 21/466; H04N 21/4884; H04N 21/8647

See application file for complete search history.

(56) References Cited

U.S. PATENT DOCUMENTS

| | | | | | |
|---|---|---|---|---|---|
| 4,570,232 | A * | 2/1986 | Shikano | G10L 15/12 | 704/241 |
| 5,598,557 | A * | 1/1997 | Doner | G06F 16/3346 | 707/999.005 |
| 6,085,160 | A * | 7/2000 | D'hoore | G10L 15/005 | 704/277 |
| 6,186,834 | B1 * | 2/2001 | Arnett | H01R 13/6467 | 439/676 |

(Continued)

OTHER PUBLICATIONS

US Patent Application filed on Mar. 24, 2025, entitled "Methods and Systems for Synchronization of Closed Captions With Content Output", U.S. Appl. No. 19/088,622.

(Continued)

*Primary Examiner* — Michael B. Pierorazio
(74) *Attorney, Agent, or Firm* — BakerHostetler

(57) ABSTRACT

Alignment between closed caption and audio/video content may be improved by determining text associated with a portion of the audio or a portion of the video and comparing the determined text to a portion of closed caption text. Based on the comparison, a delay may be determined and the audio/video content may be buffered based on the determined delay.

36 Claims, 7 Drawing Sheets

(56) References Cited

U.S. PATENT DOCUMENTS 6,188,987 B1 * 2/2001 Fielder ............... H04N 21/4342 704/229
6,442,518 B1 * 8/2002 Van Thong ............ G10L 15/26 704/235
6,473,778 B1 * 10/2002 Gibbon ................ G06F 40/103 715/201
7,047,191 B2 * 5/2006 Lange .................... G10L 15/26 704/235
7,065,524 B1 * 6/2006 Lee ....................... G16H 50/50 706/45
7,092,888 B1 * 8/2006 McCarthy .......... G10L 15/1822 704/277
7,509,385 B1 * 3/2009 Rittmeyer ........... G06Q 10/107 715/224
7,729,917 B2 * 6/2010 Miyamoto ............. G10L 15/22 704/275
7,739,253 B1 * 6/2010 Yanovsky .......... G06F 16/9535 707/706
7,801,910 B2 * 9/2010 Houh ................... G06F 16/583 707/765
7,962,331 B2 * 6/2011 Miller .................. G10L 15/193 704/235
8,027,566 B2 * 9/2011 Ikeda .................. H04N 7/0882 386/244
8,121,432 B2 * 2/2012 Dorai ................. G06F 16/7844 382/276
8,131,545 B1 * 3/2012 Moreno ................. G10L 15/04 704/235
8,423,363 B2 * 4/2013 Gupta .................... G10L 15/22 704/251
8,572,488 B2 * 10/2013 Phillips ................ G06F 3/0482 715/716
8,935,737 B2 * 1/2015 Bi ...................... H04M 3/4878 725/35
11,785,278 B1 * 10/2023 Stone ............ H04N 21/440236 348/564
2002/0055950 A1 * 5/2002 Witteman .............. G06F 16/40 707/E17.009
2002/0093591 A1 * 7/2002 Gong ................ H04N 21/2368 348/E7.063
2003/0025832 A1 * 2/2003 Swart ................ H04N 21/4828 348/E7.071
2003/0061028 A1 * 3/2003 Dey ....................... G06F 16/40 704/9
2003/0169366 A1 * 9/2003 Lenzi ...................... H04N 7/10 348/461
2003/0206717 A1 * 11/2003 Yogeshwar ........... G11B 27/10 386/328
2004/0096110 A1 * 5/2004 Yogeshwar ............ G06F 16/51 707/E17.031
2005/0227614 A1 * 10/2005 Hosking ............... H04N 7/165 455/3.06
2006/0015339 A1 * 1/2006 Charlesworth ....... G10L 15/187 704/E15.02
2006/0248073 A1 * 11/2006 Jones ................. G06F 16/3328 707/999.005
2007/0011012 A1 * 1/2007 Yurick ................... G10L 15/26 704/277
2007/0124147 A1 * 5/2007 Gopinath ............... G10L 15/19 704/E15.021
2007/0124756 A1 * 5/2007 Covell ................. G06F 16/635 348/E7.071
2007/0124788 A1 * 5/2007 Wittkoter .............. H04N 7/165 348/E7.071
2007/0214164 A1 * 9/2007 MacLennan ........... G06F 16/90
2008/0066138 A1 * 3/2008 Bishop ................... G06F 40/58 725/137
2008/0166106 A1 * 7/2008 Ozawa .............. H04N 21/8113 386/245
2008/0255844 A1 * 10/2008 Wu ...................... G10L 15/193 704/E15.022
2008/0266449 A1 * 10/2008 Rathod .............. G06F 16/7867 348/E7.001
2008/0270134 A1 * 10/2008 Miyamoto .......... H04N 7/0885 348/E7.001
2009/0171662 A1 * 7/2009 Huang ............... G10L 15/1822 704/E15.041
2010/0091187 A1 * 4/2010 Topiwalla .......... H04N 21/4355 348/E7.003
2011/0022386 A1 * 1/2011 Gatzke ................... G10L 15/26 704/235
2011/0040559 A1 * 2/2011 Kim ..................... G10L 21/055 704/271
2012/0101817 A1 * 4/2012 Mocenigo ............ G10L 15/063 704/E15.001
2012/0253799 A1 * 10/2012 Bangalore ............ G10L 15/183 704/E15.001
2016/0007054 A1 * 1/2016 Polumbus ............. G11B 27/10 725/116
2021/0204033 A1 * 7/2021 Maurice .................. G10L 25/57

OTHER PUBLICATIONS

US Patent Application filed on Mar. 18, 2022, entitled "Methods and Systems for Synchronization of Closed Captions With Content Output", U.S. Appl. No. 17/698,570.

US Patent Application filed on Sep. 6, 2023, entitled "Methods and Systems for Synchronization of Closed Captions With Content Output", U.S. Appl. No. 18/462,117.

* cited by examiner

METHODS AND SYSTEMS FOR SYNCHRONIZATION OF CLOSED CAPTIONS WITH CONTENT OUTPUT

CROSS-REFERENCE TO RELATED APPLICATIONS

This application is a continuation of U.S. patent application Ser. No. 18/462,117, filed Sep. 6, 2023, now U.S. Pat. No. 12,273,582, issued Apr. 8, 2025, which is a continuation of U.S. patent application Ser. No. 17/698,570, filed Mar. 18, 2022, now U.S. Pat. No. 11,785,278, issued Oct. 10, 2023, the entireties of which are incorporated herein by reference.

BACKGROUND

Closed captions and subtitles allow users to display text on a display of a device to provide additional or interpretive information. "Closed" indicates that captions are not visible until activated by a user, whereas "open" captions are visible to all viewers. Accordingly, closed captions may allow a user to display textual transcriptions of an audio portion of content or textual descriptions of non-speech elements of the content to a user. Ideally, closed captions and subtitles are in synchronization with audio/visual content. However, there may be lag between closed captions and audio and/or video content (e.g., by several seconds) due to, for example, technical delays associated with manual or live transcriptions. Improvements are needed for synchronization of closed captioning systems to improve viewing experience.

SUMMARY

Methods and systems are disclosed for improved alignment between closed captioned text and audio output (e.g., audio from a content creator, content provider, video player, etc.). Content including video, audio, and closed caption text may be received and, based on a portion of the audio or a portion of the video, text associated with the portion of the audio or the portion of the video may be determined. The determined text may be compared to a portion of the closed caption text and, based on the comparison, a delay may be determined. The audio or video of the content may be buffered based on the determined delay. If the closed caption text is ahead, the closed caption text stream may be buffered. For example, encoded audio may be removed from an audiovisual stream, decoded, converted to text, and then compared to a closed captioned stream. Based on the comparison, the closed captioned stream may be realigned with the audiovisual stream.

BRIEF DESCRIPTION OF THE DRAWINGS

The accompanying drawings, which are incorporated in and constitute a part of this specification, illustrate examples and together with the description, serve to explain the principles of the methods and systems.

DETAILED DESCRIPTION

Closed captions provide a text version of what takes place on a screen. For example, closed captions can provide a text version of dialogue, sound effects, or music to a viewer with a hearing impairment. However, the viewer may have difficulty understanding a program if associated closed captions do not line up properly with events or dialogue taking place on screen.

For live programming, audio including spoken words, soundtrack, sound effects, etc. may be transcribed by a human operator. For example, a speech-to-text reporter may use a stenotype (e.g., shorthand) or stenomask (e.g., voice writing) machine to convert audio into text so it may be displayed on a screen. As another example, voice recognition software may be used to convert audio into text. Due to processing times associated with existing approaches, closed captions of live broadcasts (e.g., news bulletins, sports events, live entertainment shows, etc.) often lag by several seconds. For prerecorded programs, unlike live programs, audio may be transcribed and closed captions may be prepared, positioned, and timed in advance.

In National Television Standards Committee (NTSC) programming, closed captions may be encoded into a part of the television (TV) picture that sits just above the visible portion and is usually unseen (e.g., line 21 of the vertical blanking interval). In Advanced Television Systems Committee (ATSC) programming, three streams may be encoded in the video. For example, two streams may be backward compatible "line 21" captions and a third stream may be a set of up to 63 additional caption streams (e.g., encoded in EIA-708 format).

Figure 1:
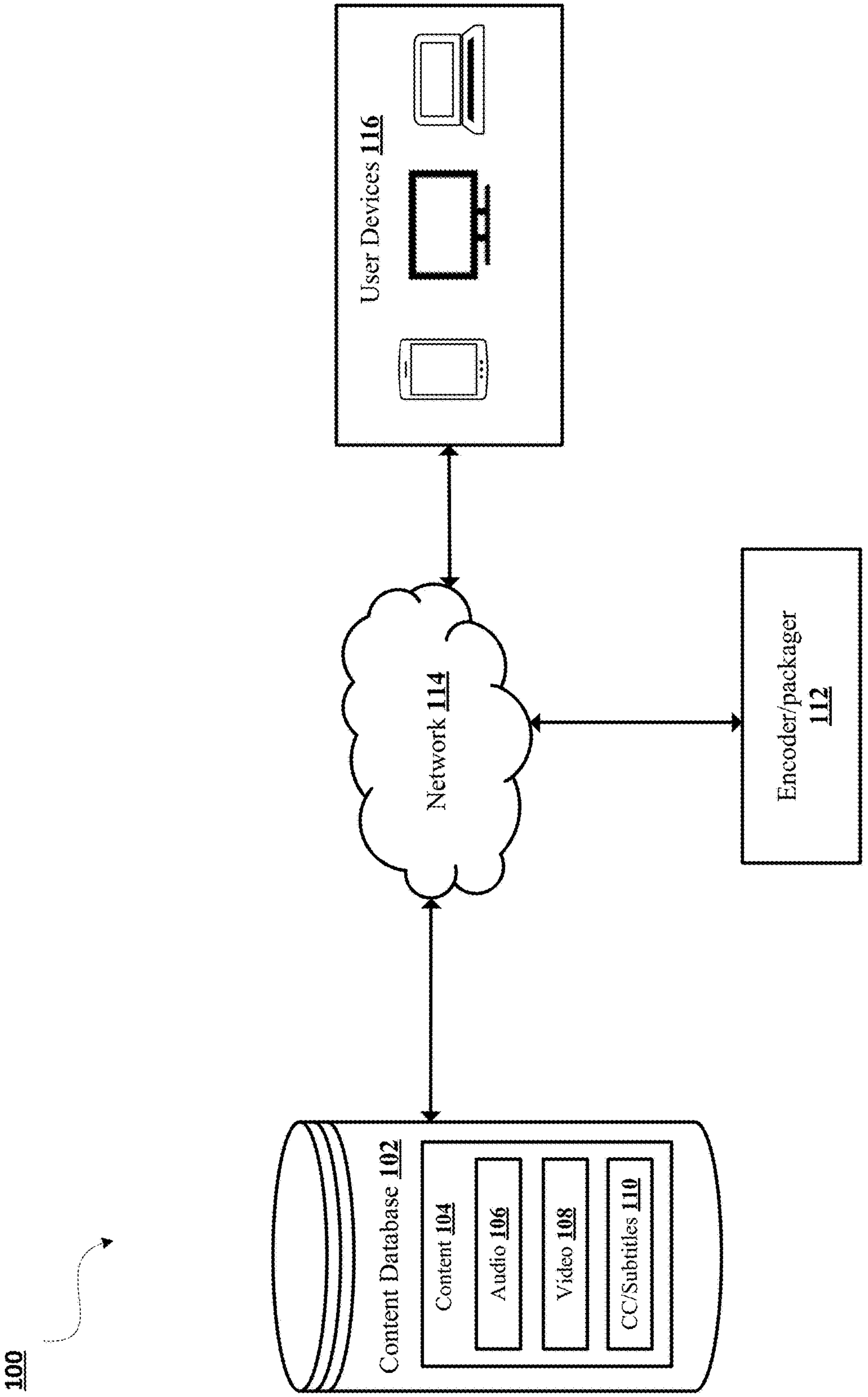
FIG. 1 shows an example environment.

FIG. 1 shows an example environment in which the systems and methods described herein may be implemented. Such an environment may comprise a content database 102, an encoder/packager 112, and at least one device 116 (e.g., a player). The content database 102, the encoder/packager 112, and the at least one device 116 may be in communication via a network 114. The content database 102, the encoder/packager 112, or the at least one device 116 may be associated with an individual or entity seeking to align content with closed captions or subtitles.

The encoder/packager 112 may implement a number of the functions and techniques described herein. For example, the encoder/packager 112 may receive content 104 from the content database 102. The content 104 may comprise, for example, audio 106, video 108, and/or closed captions 110. Audio 104 or video 106 may refer generally to any audio or video content produced for viewer consumption regardless of the type, format, genre, or delivery method. Audio 104 or video 106 may comprise audio or video content produced for broadcast via over-the-air radio, cable, satellite, or the internet. Audio 104 or video 106 may comprise digital audio or video content produced for digital video or audio streaming (e.g., video- or audio-on-demand). Audio 104 or video 106 may comprise a movie, a television show or program, an episodic or serial television series, or a documentary series, such as a nature documentary series. As yet another example, video 106 may comprise a regularly scheduled video program series, such as a nightly news program. The content 104 may be associated with one or more content distributors that distribute the content 104 to viewers for consumption.

The content 104 may comprise text data associated with content, such as closed captions 110. The closed captions 110 may indicate textual information associated with the content 104. For example, the closed captions 110 may comprise text associated with spoken dialogue, sound effects, music, etc. Content 104 may be associated with one or more genres, including sports, news, music or concert, documentary, or movie. For example, if the content is associated with the genre "sports," this may indicate that the content is a sports game, such as a livestream of a sports game.

The closed captions 110 may indicate speech associated with the content 104. For example, the closed captions 110 may indicate which speech associated with portions of content 104. Subtitles may be part of a content track included in the closed captions 110. The presence or absence of dialogue may be detected through subtitling, for example, using Supplemental Enhancement Information (SEI) messages in the video elementary stream. If the subtitles for content are part of a separate track, the absence of dialogue may be detected, for example, by detecting an "empty segment."

The content 104 (e.g., video 108) may indicate movement associated with the content. For example, the video 108 may indicate which specific movements may be associated with portions of content. The movement associated with the content 104 may be based on the encoding parameters of the content 104. The movement associated with the content 104 may comprise camera movement, where the entire scene moves. For example, if the content is a soccer game, camera movement may involve a camera panning over the soccer field. The movement associated with the content 104 may additionally, or alternatively, comprise movement of objects in the content. For example, if the content is a soccer game, object movement may involve the soccer ball being kicked.

AI or machine learning may be used (e.g., by encoder/packager 112 or user devices 116) to align and sync audio 106 and/or video 108 with closed captions 110. For example, encoder/packager 112 or user devices 116 may implement a software algorithm that listens to audio 106 and/or processes video 108 to determine when words being spoken in content 104 match those of closed captions 110.

Audio-to-text translation may be used to find accompanying text in closed captions 110 (e.g., transcribed conversations, subtitles, descriptive text, etc.) to serve as a point in the audiovisual stream (e.g., a first marker in time) and closed caption stream (e.g., a second marker in time) to establish a sync. Audio-to-text translation may also be used to find accompanying text to audio content that describes aspects of the video that are purely visual (e.g., descriptive audio, audio description, and/or video description). For example, an audiovisual presentation device (e.g., user devices 116) may be equipped with sufficient storage, e.g., dynamic random-access memory (DRAM), hard disk drive (HDD), embedded multimedia card (MMC), to buffer an incoming audiovisual stream (e.g., content 104) for several seconds. The buffered content may be concurrently demultiplexed and the audio 106, video 108, closed caption 110 components extracted. For example, the audio 106 may be decoded by a digital signal processor (DSP) or a central processing unit (CPU) (e.g., associated with encoder/packager 112 or user devices 116) and further processed by algorithms that convert the audio 106 to text.

The closed captions 110 may be decoded by the CPU and an algorithm in the CPU may compare the closed caption text to an audio-to-text translation, e.g., looking for a match in words. If the words do not match, the CPU may hold onto the closed caption text and continue to process and compare the audio-to-text translation until it finds a match. Moreover, one or more markers in time may be used by the CPU as a reference to compare the closed caption text and the audio-to-text translation. For example, one or more first markers in time may be associated with the closed caption text and one or more second markers in time may be associated with the audio-to-text translation. The one or more first markers in time and the one or more second markers in time may correspond to a time in the playback of the content 104 (e.g., when a delay is to occur).

If the audiovisual stream and closed captions are in sync, the CPU may determine there is no need to add any delay to the audiovisual stream and the content 104 may be sent to a video render engine and/or audio engine for output, e.g., over High-Definition Multimedia Interface (HDMI). According to some examples, if the content 104 and closed captions 110 are not in sync, then the CPU may determine a delay (e.g., in milliseconds) that is needed to be applied to audio 106 and/or video 108 to align the content 104 with the closed captions 110. For example, the CPU may calculate the delay by comparing one or more first markers in time associated with the closed caption text to one or more second markers in time associated with the audio-to-text translation. Moreover, the one or more markers in time may be used to identify a point in time associated with the content at which a delay may occur.

A synchronization component of the CPU may synchronize a timer to one or multiple synchronization markers (e.g., markers in time) of the content, the closed caption text, and/or the audio-to-text translation. In some examples, the markers in time may be determined by the synchronization component processing the audiovisual stream and the closed captions.

AI, machine learning, or other video processing techniques may be used to process video 108, e.g., where scenes, movements, or other visual features align with closed captions 110. For example, closed captions 110 may textually describe video associated with a scene (e.g., a car stopping or a door opening) and the CPU may process video 108 to identify a scene where a car is stopping or a door opens. Upon identifying the scene matching closed captions 110, the scene may be flagged (e.g., by recording a time, location, stamp, etc.) and a delay may be determined by comparing the flagged scene with the matching captions or subtitles. The delay may then be applied to audio 106 and/or video 108 to align the content 104 with the closed captions 110.

Artificial Intelligence (AI), machine learning, or other audio processing techniques may be used to process audio 106, e.g., where sounds, sound effects, or other audio features align with closed captions 110. A machine learning model may comprise Deep Speech, a Deep Learning Network (DLN), a recurrent neural network (RNN), or any other suitable learning algorithm. For example, closed captions 110 may textually describe audio associated with a scene (e.g., a car brakes squealing or a door creaking as it opens) and the CPU may process audio 106 to identify a scene including a squealing or creaking sound. Upon identifying the scene matching the closed captions 110, the scene may be flagged (e.g., by recording a time, location, stamp, etc.) and a delay may be determined by comparing the flagged scene with the matching captions or subtitles. The delay may then be applied to audio 106 and/or video 108 to align the content 104 with the closed captions 110.

The encoder/packager 112 may use the content 104 and content 106 to determine portions of content that are candidates for inserting a delay. For example, a scene changes in the content 104 may be indicative of a start of a new portion of the content 104. A scene in the content 104 may be a single camera shot of an event. A scene change may occur when a viewer perspective is switched to a different camera shot. In order to any negative reaction from a viewer, a delay may be associated with a scene change. For example, the delay may be inserted at a scene change, immediately before, or immediately after.

It may be desirable to adjust the output speed of content during certain portions of the content when an output speed change is not as detectable as a delay to viewers of the content. An output speed change may be less detectable to viewers, for example, during a portion of the content that contains less motion or less speech. For example, a scenery shot without any dialogue may be a good candidate for an output speed change. Accordingly, the encoder/packager 112 may use the content 104 to determine portions of content that do not contain large amounts of motion or speech. Different genres may be able to be sped up or slowed down at different rates or for different periods of time without being easily detectable to viewers of the content. For example, for sports content, output may be sped up or slowed down for only for 5 seconds or during a timeout with less motion. For news content, output may be sped up or slowed down for only for 10 seconds or during transitions between stories. For concert or music content, output may be sped up or slowed down at any time but only for 2 seconds.

The content database 102 may provide the content and the content data to the encoder/packager 112. The content database 102 may be integrated with one or more of the encoder/packager 112 or the at least one device 116. The network 114 may comprise one or more public networks (e.g., the Internet) and/or one or more private networks. A private network may comprise a wireless local area network (WLAN), a local area network (LAN), a wide area network (WAN), a cellular network, or an intranet. The network 114 may comprise wired network(s) and/or wireless network(s).

The content database 102, the encoder/packager 112, and the at least one device 116 may each be implemented on the same or different computing devices. For example, the content database 102 may be located in a datastore of the same organization as the encoder/packager 112, or in the datastore of a different organization. Such a computing device may comprise one or more processors and memory storing instructions that, when executed by the one or more processors, cause the computing device to perform one or more of the various methods or techniques described here. The memory may comprise volatile memory (e.g., random access memory (RAM)) and/or non-volatile memory (e.g., a hard or solid-state drive). The memory may comprise a non-transitory computer-readable medium.

Figure 2:
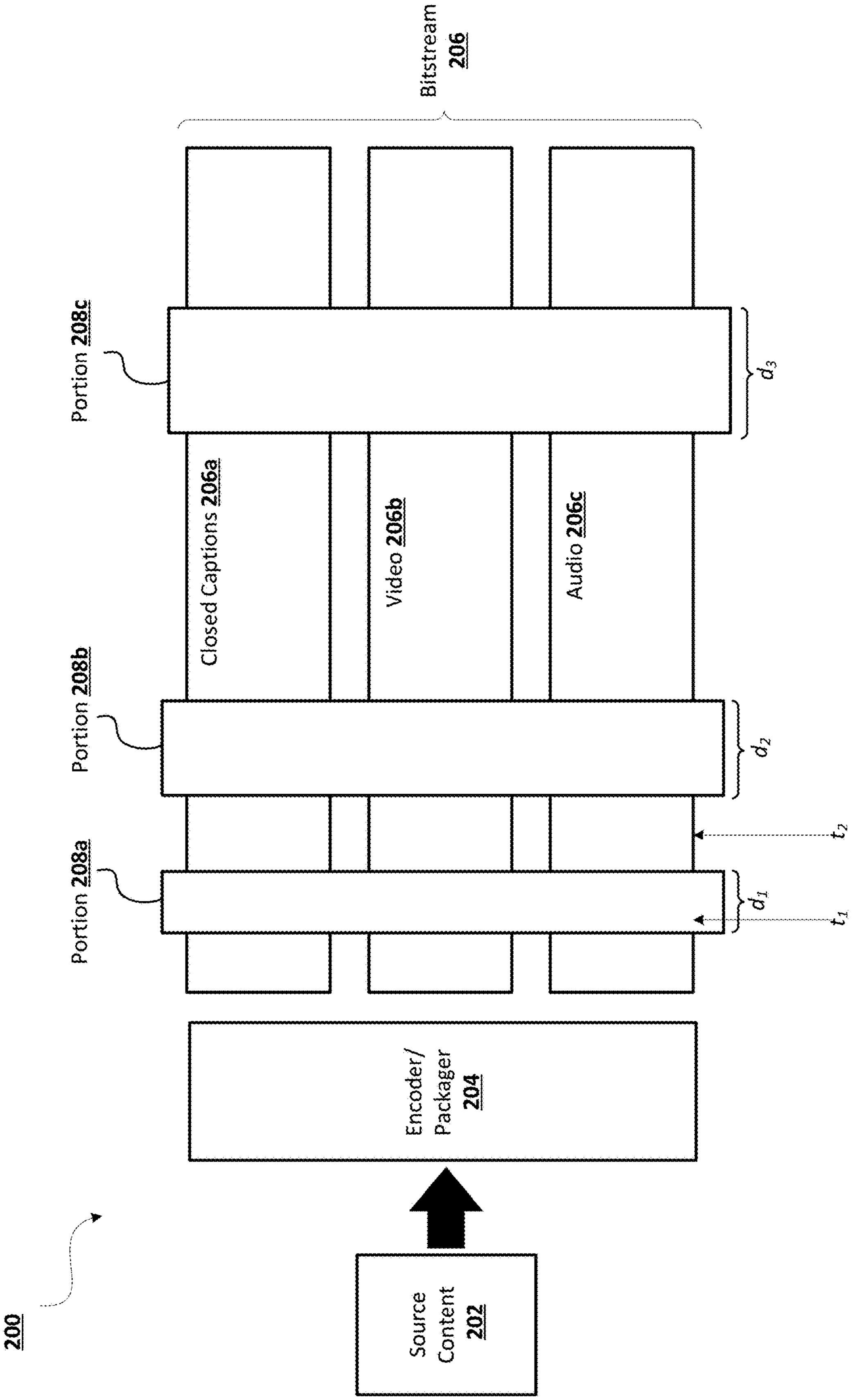
FIG. 2 shows an example encoder.

FIG. 2 shows an exemplary encoding environment 200. The encoding environment 200 may comprise source content 202, an encoder/packager 204, and an encoded bitstream 206. The source content 202 may comprise content, such as content 104 (e.g., including audio 106, video 108, and/or closed captions 110). The source content 202 may be input into the encoder/packager 204. For example, the encoder/packager 204 may be the encoder/packager 112 of FIG. 1. The encoder/packager 204 may generate the encoded bitstream 206 associated with the source content 202. For example, the encoded bitstream 206 may comprise one or more of a closed caption bitstream 206*a*, a video bitstream 206*b*, or an audio bitstream 206*c*. If the encoded bitstream 206 comprises the closed caption bitstream 206*a*, the closed caption bitstream 206*a* may comprise textual data associated with the source content 202. If the encoded bitstream 206 comprises the video bitstream 206*b*, the video bitstream 206*b* may indicate video data associated with the source content 202. If the encoded bitstream 206 comprises the audio bitstream 206*c*, the audio bitstream 206*c* may indicate audio data associated with the source content 202.

The encoded bitstream 206 may comprise at least one indication of portions of content that are good candidates for delay or output speed change, such as portions 208*a-c*. As discussed above, it may be desirable to insert a delay and/or adjust the output speed of content during certain portions of the content when an output speed change is less detectable to viewers of the content. Accordingly, the portions 208*a-c* may be portions of content during which a delay or an output speed change may not be easily detectable by viewers of the content. The encoded bitstream 206 may indicate at least one of a start time (e.g., a marker in time) associated with each of these portions of content or a duration of each of these portions of content. For example, the encoded bitstream 206 may indicate that the portion 208*a* has a start time $t_1$ and a duration $d_1$, the portion 208*b* has a start time $t_2$ and a duration $d_2$, and the portion 208*c* has a duration $d_3$. The durations of the different portions may be different or may be the same. The encoded bitstream 206 may comprise an indication of a rate of output speed change associated with each portion of content that is a good candidate for output speed change, such as the portions 208*a-c*. The rate of output speed change associated with a particular portion of content may indicate how much output of content may be sped up or slowed down, or both sped up and slowed down, during that portion of content without being easily detectable to viewers of the content. For example, output of content may be either sped up or slowed down during a portion of content in a scenery view that contains no dialogue. The encoded bitstream 206 may be used by a device, such as the at least one device 116 of FIG. 1, to output the content associated with the source content 202 and to adjust the output speed of the content during the portions 208*a-c*.

Figure 3:
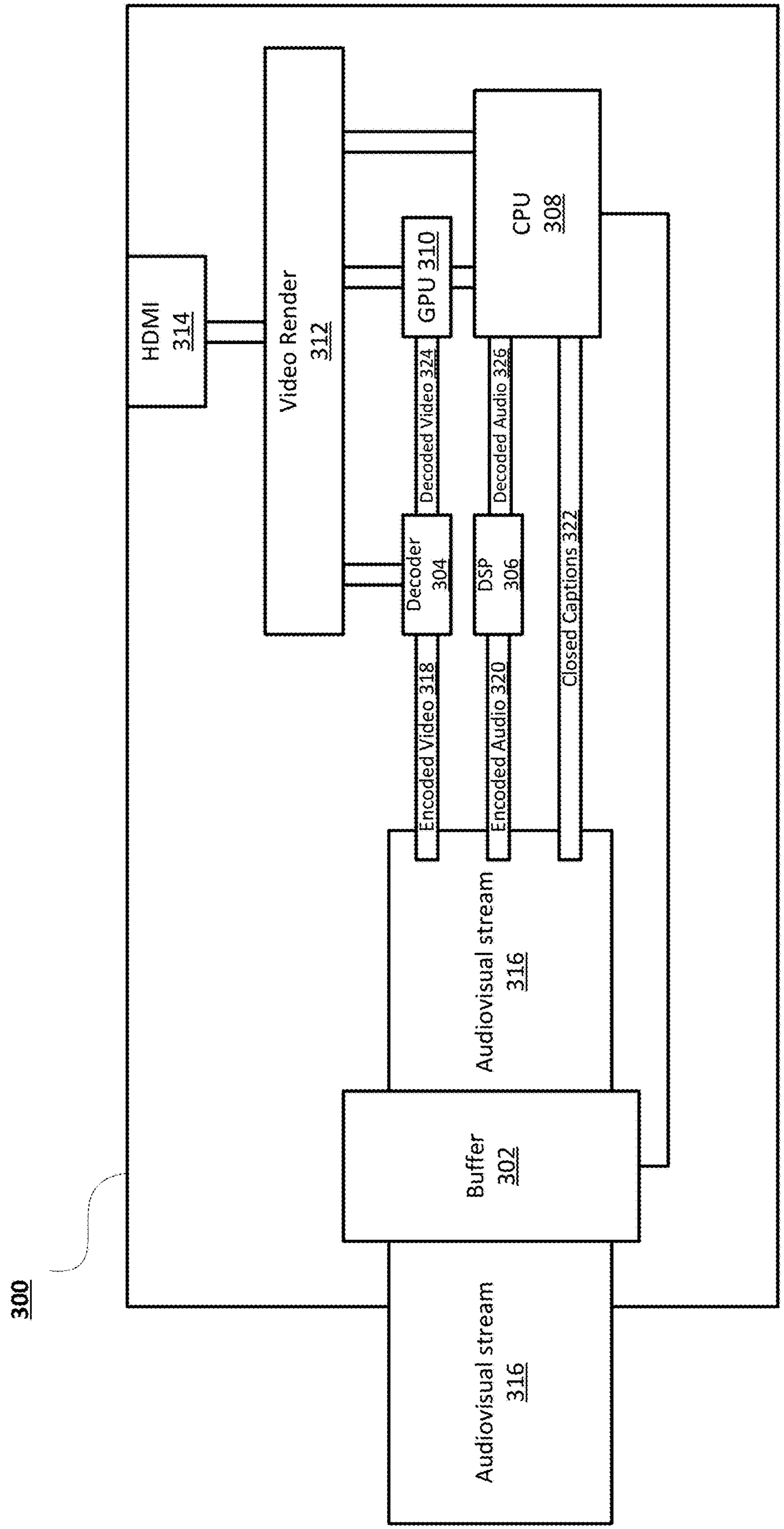
FIG. 3 shows an example user device.

FIG. 3 shows an example user device 300 in which the systems and methods described herein may be implemented. User device 300 may comprise a buffer 302 (e.g., DRAM, FLASH, HDD, etc.), a decoder 304, a digital signal processor (DSP) 306, a central processing unit (CPU) 308, and a graphics processing unit (GPU) 310. The device 300 may provide playback of an audiovisual stream 316 by a video rendering engine 312 and/or a high-definition multimedia interface (HDMI) 314. Moreover, the device 300 may be associated with an individual or entity seeking to align content with closed captions or subtitles.

The device 300 may receive an audiovisual stream 316. The audiovisual stream 316 may comprise encoded video 318, encoded audio 320, and closed captions 322. The encoded video 318 may be decoded by the decoder 304 resulting in decoded video 324. The decoded video 324 may be provided by the decoder 304 to the GPU 310. The encoded audio 320 may be decoded by the DSP 306 resulting in decoded audio 326.

The CPU 308 may be configured to receive the decoded audio 326. The CPU 308 may be configured to perform an audio-to-text conversion of the decoded audio 326. The CPU 308 may be configured to compare the converted text to the closed captions 322. One or more markers in time may be used by the CPU 308 as a reference to compare the closed captions 322 and the audio-to-text conversion of the decoded audio 326. For example, one or more first markers in time may be associated with the closed captions 322 and one or more second markers in time may be associated with the audio-to-text conversion of the decoded audio 326. The one or more first markers in time may synchronize to a time of the decoded audio 326 and the one or more second markers in time may synchronize to a time of the audio-to-text translation, so as to correspond to a time in the playback of the audiovisual stream 316 (e.g., when a buffering delay is to occur).

Based on the comparison, the CPU 308 may be configured to determine a buffering delay to synchronize the closed captioning content 322 with the audiovisual stream 316. For example, the buffering delay may compensate for an offset between timing of the decoded audio 326 and the closed captions 322. For example, the CPU 308 may calculate the buffering delay by comparing one or more first markers in time associated with the closed captions 322 to one or more second markers in time associated with the decoded audio 326. Moreover, the one or more markers in time may be used to identify a point in time associated with the audiovisual stream 316 at which a delay may occur.

A synchronization component of the CPU 308 may synchronize a timer to one or multiple synchronization markers in time of the audiovisual stream 316, the closed captions 322, or the decoded audio 326. In some examples, the markers in time may be determined by the synchronization component processing the decoded audio 326 and the closed captions 322.

The CPU 308 may be configured to provide the determined delay to the buffer 302. The buffer 302 may be configured to insert the determined delay into the audiovisual stream to synchronize audio and visual components of the audiovisual stream (e.g., encoded video 318 and encoded audio 320) with closed caption content (e.g., closed captions 322). For example, the buffer 302 may synchronize the audio and visual components of the audiovisual stream 316 with closed caption text by buffering one or more of the audio (e.g., encoded audio 320), the video (e.g., encoded video 318), and the closed caption text (e.g., closed captions 322).

Figure 4:
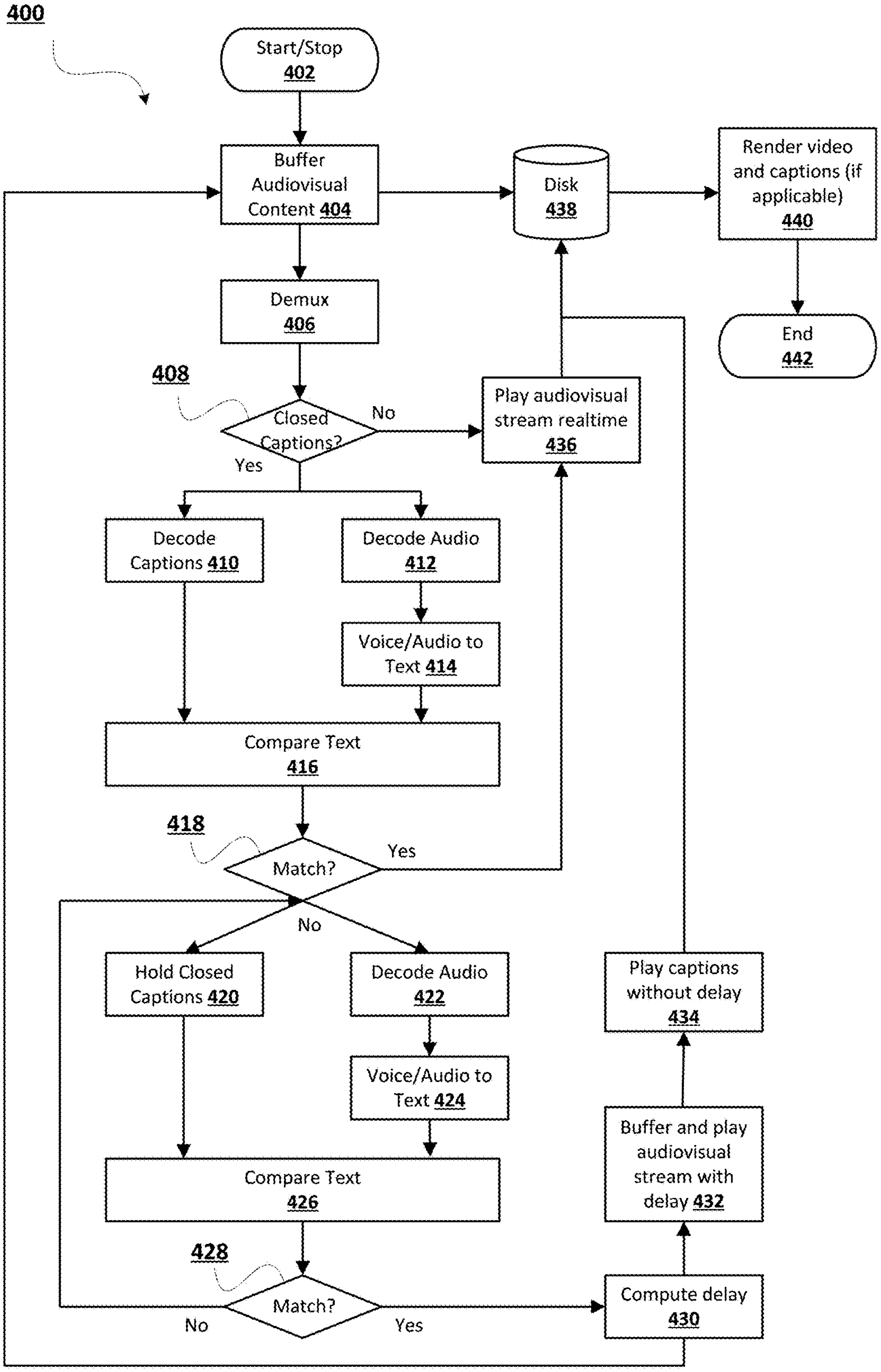
FIG. 4 shows an example method.

FIG. 4 shows an exemplary method 400. The method 400 may be used to align closed captions with audiovisual content, such as the content 104 associated with FIG. 1. The method 400 may be performed, for example, by the system 100 of FIG. 1 or device 300 of FIG. 3. Content may be received. Content may comprise a content asset or program, such as linear content, and may further comprise sequential content such as, for example, a television show, a movie, a sports event broadcast, or the like. Moreover, the content may comprise livestreaming video content or other types of content. As used herein, content may additionally include a portion of a program or content asset.

At step 402, at least one content may be received. For example, the at least one content may be received by an encoder, such as the encoder/packager 112 or encoder/packager 204. The at least one content may comprise video content (e.g., video **206*b* or encoded video 318), audio content (e.g., audio 206*c* or encoded audio 320), and closed captioning (e.g., closed captions 206*a* or closed captions 322). The at least one content may comprise livestreaming content (e.g., source content 202 or audiovisual stream 316) and, for example, the at least one content may comprise a livestreaming concert, sports program, news program, documentary, or movie. One or more markers in time may be associated with the video content (e.g., video 206*b* or encoded video 318), audio content (e.g., audio 206*c* or encoded audio 320), and closed captioning (e.g., closed captions 206*a* or closed captions 322**).

At step 404, the audiovisual content may be buffered (e.g., based on a computed delay from step 430) and, at step 406, the buffered content from step 404 (e.g., carrying multiple encoded data streams) may enter demultiplexer (demux) 406. This demux 406 may serve as a switch, e.g., by selecting which video and which audio data stream in a multiplexed transport stream to pass on. For example, demux 406 may pass on an audio stream, a video stream, and/or a closed caption stream.

At step 408, it may be determined whether the content comprises closed captions. If the content does not comprise closed captions, it may be determined to play the audiovisual stream in real-time at step 436. If the content does comprise closed captions, the closed captions may be decoded at step 410 and the audio may be decoded at step 412. Voice or audio to text conversion may be performed at step 414.

At step 416, the decoded captions from step 410 may be compared to the converted text from step 414 and, at step 418, it may be determined, based on the comparison at step 416, whether the closed captions (e.g., from step 410) match the converted text (e.g., from step 414). If the content does match the converted text, it may be determined to play the audiovisual stream in real-time at step 436. If the closed captions do not match the converted text, the closed captions may be held at step 420 (e.g., for a constant or variable time period) and the audio may be decoded at step 422. Voice or audio to text conversion may be performed at step 424.

At step 426, the held captions from step 420 may be compared to the converted text from step 424. At step 428, it may be determined, based on the comparison at step 426, whether the held closed captions (e.g., from step 420) match the converted text (e.g., from step 426). If the held closed captions do not match the converted text, the process may repeat itself by once again holding the closed captions at step 420, decoding the audio at step 422, performing voice or audio to text conversion at step 424, and, at step 426, comparing the held captions from step 420 with the converted text from step 424. This process may be repeated iteratively until, at step 428, it is determined (e.g., based on the comparison at step 426) that the held closed captions (e.g., from step 420) match the converted text (e.g., from step 426).

Once a match has been determined at step 428, a delay may be competed at step 430. The delay may be a time offset of the closed captions to the decoded audio. For example, the delay may be computed based on a length of time and/or a number of times that the closed captions are held at step 420. Moreover, the delay may be computed based on a comparison of markers in time associated with the closed captions and the decoded audio. At step 432, the audiovisual stream may be buffered and played with the computed delay and, at step 434, the captions may be played without delay.

At step 438, the audiovisual stream from step 436 and/or the captions from step 434 and the buffered audiovisual stream from step 432 may be stored to disk. If the user has turned on/enabled closed captions, then at step 440, the video and captions may be rendered and, at step 442, the process may end (e.g., terminate).

Figure 5:
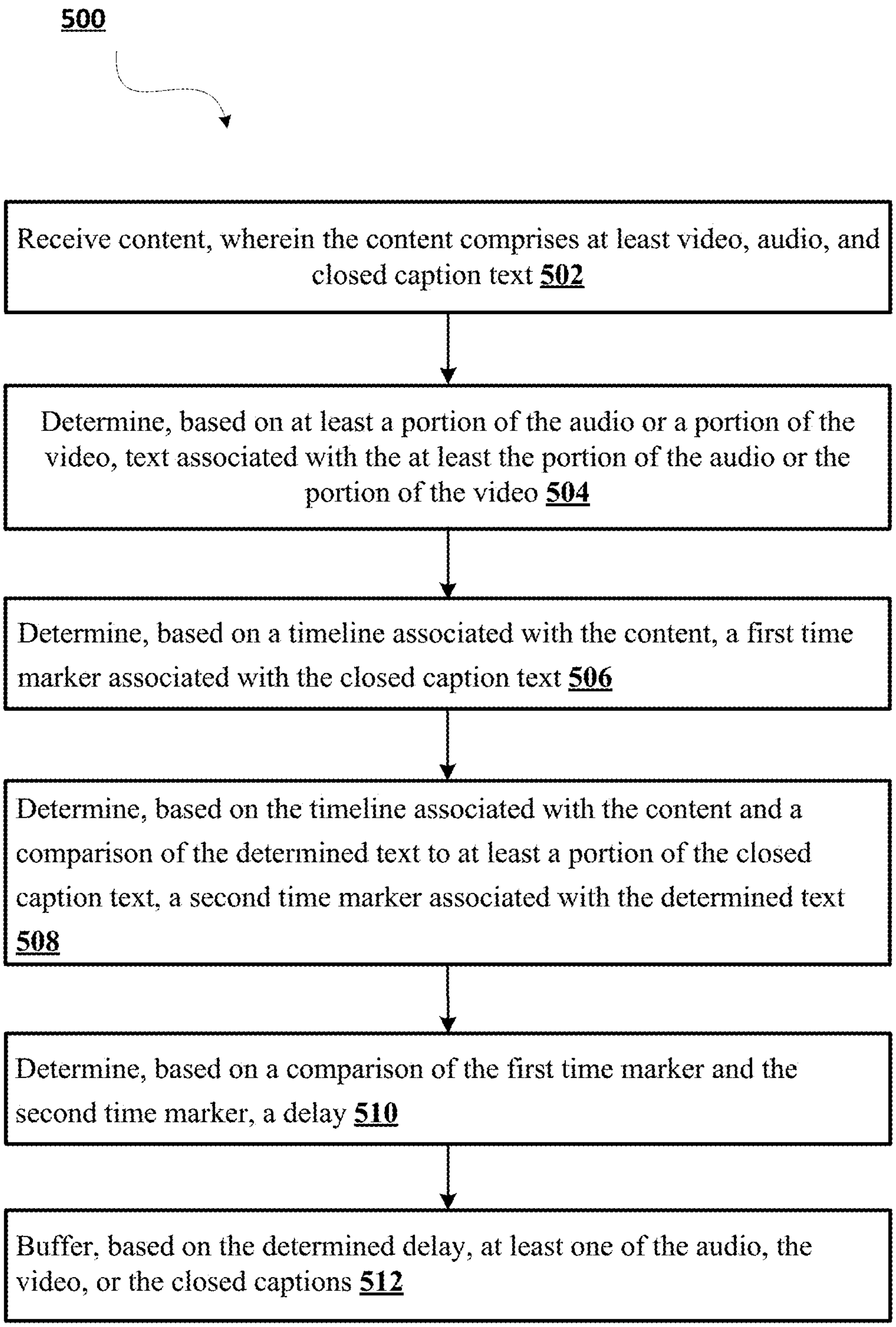
FIG. 5 shows an example method.

FIG. 5 shows an exemplary method 500. The method 500 may be used for aligning closed captions with audiovisual content, such as the content 104 associated with FIG. 1. The method 500 may be performed, for example, by one or more components of system 100 of FIG. 1 or device 300 of FIG. 3.

At step 502, content including video, audio, and/or closed captions may be received. For example, livestreaming video content may be received, although content may refer generally to any audio or video content produced for viewer consumption regardless of the type, format, genre, or delivery method. The content may be associated with one or more content distributors that distribute the content to viewers for consumption. The closed captions may indicate textual information associated with the content. For example, the closed captions may comprise text associated with spoken dialogue, sound effects, music, etc. The content may be associated with one or more genres, including sports, news, music or concert, documentary, or movie.

The closed captions may indicate speech associated with the content. For example, the closed captions may indicate which speech associated with portions of content. Subtitles may be part of a content track included in the closed captions. The presence or absence of dialogue may be detected through subtitling, for example, using SEI messages in the video elementary stream. If the subtitles for content are part of a separate track, the absence of dialogue may be detected, for example, by detecting an "empty segment."

At step 504, text associated with at least a portion of the audio or a portion of the video may be determined based on the at least the portion of the audio or the portion of the video. An audio-to-text conversion (e.g., transcribed conversations, subtitles, descriptive text, etc.) may be performed on a portion of the audio or a visual analysis map be performed to describe a portion of the video with text. For example, a software algorithm may listen to audio and/or processes video associated with the content to determine words being spoken in the content. As another example, a software algorithm may identify descriptive audio (e.g., additional audio content that describes aspects of the video that are purely visual) and may convert the descriptive audio of the content to text.

An audiovisual presentation device may be equipped with sufficient storage (e.g., DRAM, HDD, eMMC) to buffer an incoming audiovisual stream for several seconds. The buffered content may be concurrently demultiplexed and the audio, video, and/or closed caption components extracted. For example, the audio or video may be decoded by a digital signal processor (DSP) or a central processing unit (CPU) and further processed by algorithms that convert the audio or video to text. AI, machine learning, or other video or audio processing techniques may be used to process video or audio associated with the content, e.g., where scenes, movements, sounds, sound effects, or other visual/audio features align with closed captions.

At step 504, a first time marker associated with the closed caption text may be determined based on a timeline associated with the content. For example, closed captions at a first time of a timeline associated with the content may textually describe video associated with a scene (e.g., a car stopping or a door opening).

At step 506, a second time marker associated with the determined text (e.g., from step 502) may be determined based on the timeline associated with the content and a comparison of the determined text to at least a portion of the closed caption text. For example, the video associated with the content may be processed to identify a scene where a car is stopping or a door opens. Upon identifying the scene matching closed captions at a second time of the timeline associated with the content, the scene may be flagged (e.g., by recording a time, location, stamp, etc.).

At step 508, a delay may be determined based on a comparison of the first time marker and the second time marker. For example, the delay may be determined by comparing the second marker associated with the flagged scene to the first marker associated with the matching captions or subtitles.

The closed captions may be decoded and the closed caption text may be compared to a audio-to-text translation, e.g., looking for a match in words. If the words do not match, the closed caption text may be held and the audio-to-text translation may be iteratively processed and compared to the held closed caption text until a match is identified. If the audiovisual stream and closed captions are in sync, it may be determined that there is no need to add any delay to the audiovisual stream and the content may be sent to a video render engine and/or audio engine for output (e.g., over HDMI). If the content and closed captions are not in sync, then a delay may be determined (e.g., in milliseconds) that is needed to be applied to audio and/or video to align the content with the closed captions.

At step 510, at least one of the audio, the video, or the closed captions of the content may be buffered based on the determined delay. For example, the determined delay may be applied to the audio and/or the video associated with the content to align the content with the closed captions. As another example, the determined delay may be applied to the closed captions associated with the content to align the audio and/or the video with the closed captions. Portions of the content may be identified as candidates for inserting a delay. For example, in order to avoid any negative reaction from a viewer, a delay may be associated with a scene change. For example, the delay may be inserted at a scene change, immediately before, or immediately after.

It may be desirable to adjust the output speed of content during certain portions of the content when an output speed change is not as detectable as a delay to viewers of the content. An output speed change may be less detectable to viewers, for example, during a portion of the content that contains less motion or less speech. For example, a scenery shot without any dialogue may be a good candidate for an output speed change. Accordingly, the portions of content may be identified that do not contain large amounts of motion or speech. Different genres may be able to be sped up or slowed down at different rates or for different periods of time without being easily detectable to viewers of the content. For example, for sports content, output may be sped up or slowed down for only for 5 seconds or during a timeout with less motion. For news content, output may be sped up or slowed down for only for 10 seconds or during transitions between stories. For concert or music content, output may be sped up or slowed down at any time but only for 2 seconds. As another example, transitions into and out of commercials may be used to align the content with the closed captions, e.g., metadata associated with the transitions may indicate timing for a local advertisement insertion and may be used to align content with the closed captions.

Figure 6:
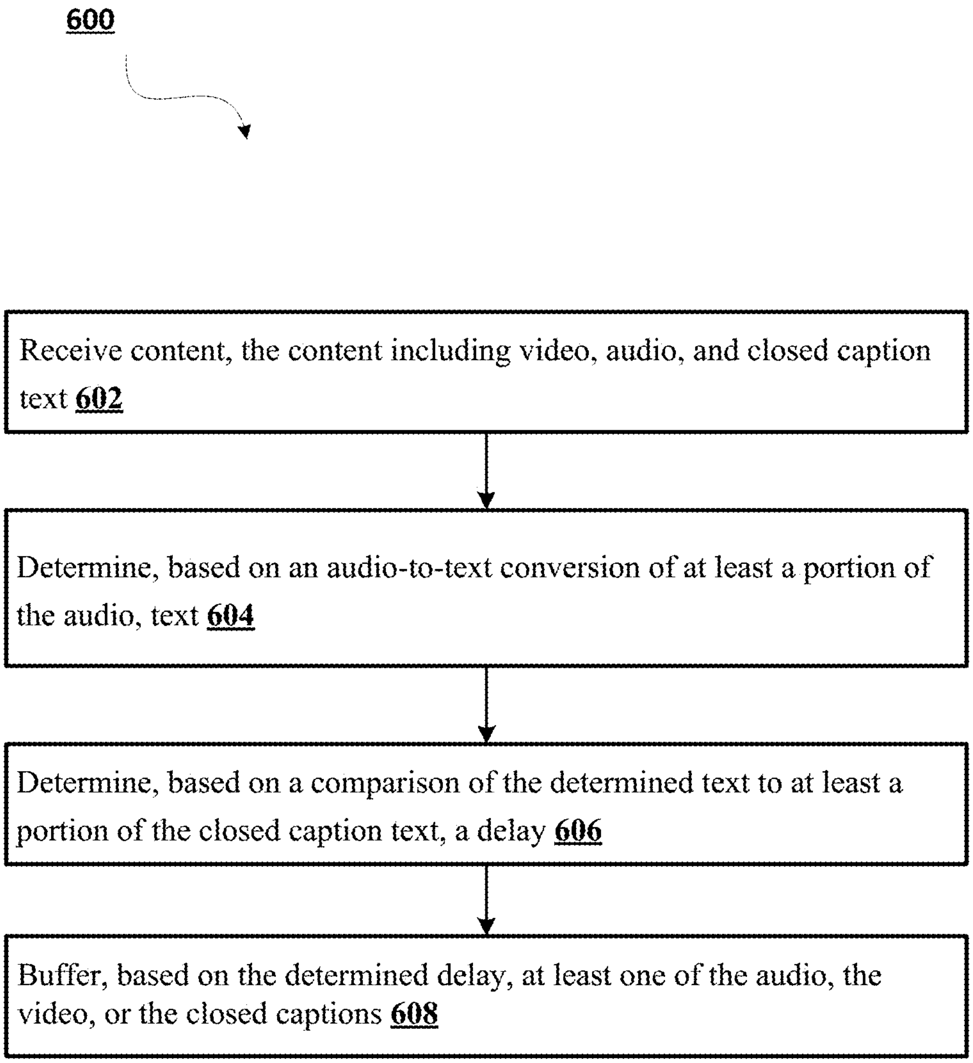
FIG. 6 shows an example method.

FIG. 6 shows an exemplary method 600. The method 600 may be used for aligning closed captions with audiovisual content, such as the content 104 associated with FIG. 1. The method 600 may be performed, for example, by one or more components of system 100 of FIG. 1 or device 300 of FIG. 3.

At step 602, content (e.g., including video, audio, and/or closed caption text) may be received. For example, livestreaming video content may be received, although content may refer generally to any audio or video content produced for viewer consumption regardless of the type, format, genre, or delivery method. The content may be associated with one or more content distributors that distribute the content to viewers for consumption. The closed captions may indicate textual information associated with the content. For example, the closed captions may comprise text associated with spoken dialogue, sound effects, music, etc. The content may be associated with one or more genres, including sports, news, music or concert, documentary, or movie.

The closed captions may indicate speech associated with the content. For example, the closed captions may indicate which speech associated with portions of content. Subtitles may be part of a content track included in the closed captions. The presence or absence of dialogue may be detected through subtitling, for example, using SEI messages in the video elementary stream. If the subtitles for content are part of a separate track, the absence of dialogue may be detected, for example, by detecting an "empty segment."

At step 604, text may be determined based on an audio-to-text conversion (e.g., transcribed conversations, subtitles, descriptive text, etc.) of at least a portion of the audio. For example, a software algorithm may listen to audio associated with the content to determine words being spoken in the content.

An audiovisual presentation device may be equipped with sufficient storage (e.g., DRAM, HDD, eMMC) to buffer an incoming audiovisual stream for several seconds. The buffered content may be concurrently demultiplexed and the audio, video, and/or closed caption components extracted. For example, the audio may be decoded by a digital signal processor (DSP) or a central processing unit (CPU) and further processed by algorithms that convert the audio to text. AI, machine learning, or other video or audio processing techniques may be used to process audio associated with the content, e.g., where sounds, sound effects, or other audio features align with closed captions.

The closed captions may be decoded and the closed caption text may be compared to a audio-to-text translation, e.g., looking for a match in words. If the words do not match, the closed caption text may be held and the audio-to-text translation may be iteratively processed and compared to the held closed caption text until a match is identified. If the audiovisual stream and closed captions are in sync, it may be determined that there is no need to add any delay to the audiovisual stream and the content may be sent to a video render engine and/or audio engine for output (e.g., over HDMI). If the content and closed captions are not in sync, then a delay may be determined (e.g., in milliseconds) that is needed to be applied to audio to align the content with the closed captions.

At step 608, at least one of the audio, the video, or the closed captions of the content may be buffered based on the determined delay. For example, the determined delay may be applied to the audio and/or the video associated with the content to align the content with the closed captions. As another example, the determined delay may be applied to the closed captions associated with the content to align the audio and/or the video with the closed captions. Portions of the content may be identified as candidates for inserting a delay. For example, in order to avoid any negative reaction from a viewer, a delay may be associated with a scene change. For example, the delay may be inserted at a scene change, immediately before, or immediately after.

It may be desirable to adjust the output speed of content during certain portions of the content when an output speed change is not as detectable as a delay to viewers of the content. An output speed change may be less detectable to viewers, for example, during a portion of the content that contains less motion or less speech. For example, a scenery shot without any dialogue may be a good candidate for an output speed change. Accordingly, the portions of content may be identified that do not contain large amounts of motion or speech. Different genres may be able to be sped up or slowed down at different rates or for different periods of time without being easily detectable to viewers of the content. For example, for sports content, output may be sped up or slowed down for only for 5 seconds or during a timeout with less motion. For news content, output may be sped up or slowed down for only for 10 seconds or during transitions between stories. For concert or music content, output may be sped up or slowed down at any time but only for 2 seconds.

Figure 7:
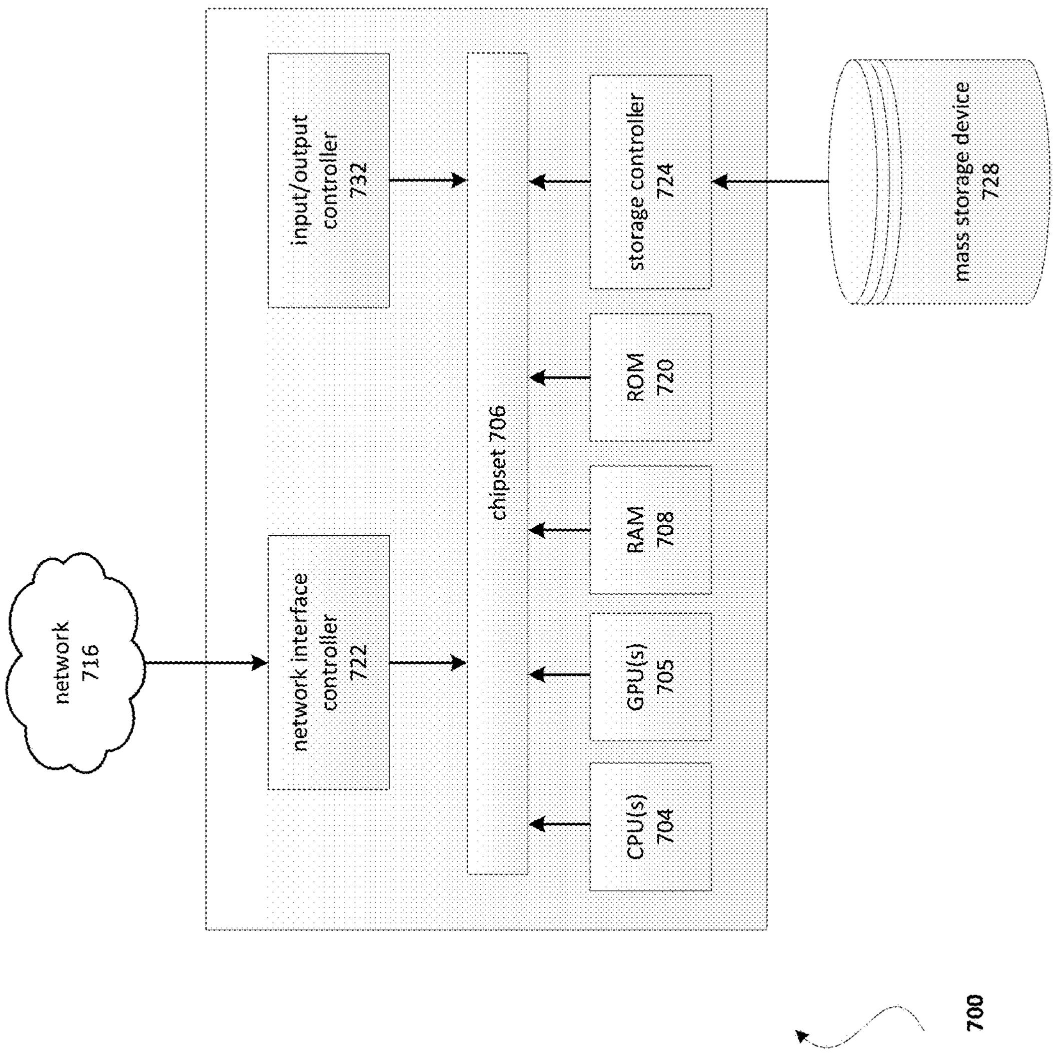
FIG. 7 shows an example computing device.

FIG. 7 shows an example computing device that may be used in various examples. With regard to the example environment of FIG. 1, one or more of the content database 102, the encoder/packager 112, or the at least one device 116 may be implemented in an instance of a computing device 700 of FIG. 7. The computer architecture shown in FIG. 7 shows a conventional server computer, workstation, desktop computer, laptop, tablet, network appliance, PDA, e-reader, digital cellular phone, or other computing node, and may be utilized to execute any aspects of the computers described herein, such as to implement the methods described in FIGS. 3-5.

The computing device 700 may comprise a baseboard, or "motherboard," which is a printed circuit board to which a multitude of components or devices may be connected by way of a system bus or other electrical communication paths. One or more central processing units (CPUs) 704 may operate in conjunction with a chipset 706. The CPU(s) 704 may be standard programmable processors that perform arithmetic and logical operations necessary for the operation of the computing device 700.

The CPU(s) 704 may perform the necessary operations by transitioning from one discrete physical state to the next through the manipulation of switching elements that differentiate between and change these states. Switching elements may generally comprise electronic circuits that maintain one of two binary states, such as flip-flops, and electronic circuits that provide an output state based on the logical combination of the states of one or more other switching elements, such as logic gates. These basic switching elements may be combined to create more complex logic circuits including registers, adders-subtractors, arithmetic logic units, floating-point units, and the like.

The CPU(s) 704 may be augmented with or replaced by other processing units, such as graphic processing units (GPUs) 705. The GPU(s) 705 may comprise processing units specialized for but not necessarily limited to highly parallel computations, such as graphics and other visualization-related processing.

A user interface may be provided between the CPU(s) 704 and the remainder of the components and devices on the baseboard. The interface may be used to access a random-access memory (RAM) 708 used as the main memory in the computing device 700. The interface may be used to access a computer-readable storage medium, such as a read-only memory (ROM) 720 or non-volatile RAM (NVRAM) (not shown), for storing basic routines that may help to start up the computing device 700 and to transfer information between the various components and devices. ROM 720 or NVRAM may also store other software components necessary for the operation of the computing device 700 in accordance with the examples described herein. The user interface may be provided by a one or more electrical components such as the chipset 706.

The computing device 700 may operate in a networked environment using logical connections to remote computing nodes and computer systems through local area network (LAN) 716. The chipset 706 may comprise functionality for providing network connectivity through a network interface controller (NIC) 722, such as a gigabit Ethernet adapter. A NIC 722 may be capable of connecting the computing device 700 to other computing nodes over a network 716. It should be appreciated that multiple NICs 722 may be present in the computing device 700, connecting the computing device to other types of networks and remote computer systems.

The computing device 700 may be connected to a storage device 728 that provides non-volatile storage for the computer. The storage device 728 may store system programs, application programs, other program modules, and data, which have been described in greater detail herein. The storage device 728 may be connected to the computing device 700 through a storage controller 724 connected to the chipset 706. The storage device 728 may consist of one or more physical storage units. A storage controller 724 may interface with the physical storage units through a serial attached SCSI (SAS) interface, a serial advanced technology attachment (SATA) interface, a fiber channel (FC) interface, or other type of interface for physically connecting and transferring data between computers and physical storage units.

The computing device 700 may store data on a storage device 728 by transforming the physical state of the physical storage units to reflect the information being stored. The specific transformation of a physical state may depend on various factors and on different implementations of this description. Examples of such factors may include, but are not limited to, the technology used to implement the physical storage units and whether the storage device 728 is characterized as primary or secondary storage and the like.

For example, the computing device 700 may store information to the storage device 728 by issuing instructions through a storage controller 724 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit. Other transformations of physical media are possible without departing from the scope and spirit of the present description, with the foregoing examples provided only to facilitate this description. The computing device 700 may read information from the storage device 728 by detecting the physical states or characteristics of one or more particular locations within the physical storage units.

In addition or alternatively to the storage device 728 described herein, the computing device 700 may have access to other computer-readable storage media to store and retrieve information, such as program modules, data structures, or other data. It should be appreciated by those skilled in the art that computer-readable storage media may be any available media that provides for the storage of non-transitory data and that may be accessed by the computing device 700.

By way of example and not limitation, computer-readable storage media may comprise volatile and non-volatile, transitory computer-readable storage media and non-transitory computer-readable storage media, and removable and non-removable media implemented in any method or technology. Computer-readable storage media includes, but is not limited to, RAM, ROM, erasable programmable ROM ("EPROM"), electrically erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage, other magnetic storage devices, or any other medium that may be used to store the desired information in a non-transitory fashion.

A storage device, such as the storage device 728 depicted in FIG. 7, may store an operating system utilized to control the operation of the computing device 700. The operating system may comprise a version of the LINUX operating system. The operating system may comprise a version of the WINDOWS SERVER operating system from the MICROSOFT Corporation. According to additional examples, the operating system may comprise a version of the UNIX operating system. Various mobile phone operating systems, such as IOS and ANDROID, may also be utilized. It should be appreciated that other operating systems may also be utilized. The storage device 728 may store other system or application programs and data utilized by the computing device 700.

The storage device 728 or other computer-readable storage media may also be encoded with computer-executable instructions, which, when loaded into the computing device 700, transforms the computing device from a general-purpose computing system into a special-purpose computer capable of implementing the examples described herein. These computer-executable instructions transform the computing device 700 by specifying how the CPU(s) 704 transition between states, as described herein. The computing device 700 may have access to computer-readable storage media storing computer-executable instructions, which, when executed by the computing device 700, may perform the methods described in relation to FIGS. 4-6.

A computing device, such as the computing device 700 depicted in FIG. 7, may also comprise an input/output controller 732 for receiving and processing input from a number of input devices, such as a keyboard, a mouse, a touchpad, a touch screen, an electronic stylus, or other type of input device. Similarly, an input/output controller 732 may provide output to a display, such as a computer monitor, a flat-panel display, a digital projector, a printer, a plotter, or other type of output device. It will be appreciated that the computing device 700 may not comprise all of the components shown in FIG. 7, may comprise other components that are not explicitly shown in FIG. 7, or may utilize an architecture completely different than that shown in FIG. 7. In some implementations of the computing device 700, certain components, such as for example, the network interface controller 722, input/output controller 732, CPUs 704, 705 and storage controller 724, may be implemented using a System on Chip (SoC) architecture.

As described herein, a computing device may be a physical computing device, such as the computing device 700 of FIG. 7. A computing node may also comprise a virtual machine host process and one or more virtual machine instances. Computer-executable instructions may be executed by the physical hardware of a computing device indirectly through interpretation and/or execution of instructions stored and executed in the context of a virtual machine.

Components are described that may be used to perform the described methods and systems. When combinations, subsets, interactions, groups, etc., of these components are described, it is understood that while specific references to each of the various individual and collective combinations and permutations of these may not be explicitly described, each is specifically contemplated and described herein, for all methods and systems. This applies to all aspects of this application including, but not limited to, operations in described methods. Thus, if there are a variety of additional operations that may be performed it is understood that each of these additional operations may be performed with any specific example or combination of examples of the described methods.

The present methods and systems may be understood more readily by reference to the following detailed description of examples included therein and to the Figures and their descriptions.

As will be appreciated by one skilled in the art, the methods and systems may take the form of an entirely hardware example, an entirely software example, or an example combining software and hardware aspects. Furthermore, the methods and systems may take the form of a computer program product on a computer-readable storage medium having computer-readable program instructions (e.g., computer software) embodied in the storage medium. More particularly, the present methods and systems may take the form of web-implemented computer software. Any suitable computer-readable storage medium may be utilized including hard disks, CD-ROMs, optical storage devices, or magnetic storage devices.

Examples of the methods and systems are described below with reference to block diagrams and flowchart illustrations of methods, systems, apparatuses and computer program products. It will be understood that each block of the block diagrams and flowchart illustrations, and combinations of blocks in the block diagrams and flowchart illustrations, respectively, may be implemented by computer program instructions. These computer program instructions may be loaded on a general-purpose computer, special-purpose computer, or other programmable data processing apparatus to produce a machine, such that the instructions which execute on the computer or other programmable data processing apparatus create a means for implementing the functions specified in the flowchart block or blocks.

These computer program instructions may also be stored in a computer-readable memory that may direct a computer or other programmable data processing apparatus to function in a particular manner, such that the instructions stored in the computer-readable memory produce an article of manufacture including computer-readable instructions for implementing the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions that execute on the computer or other programmable apparatus provide steps for implementing the functions specified in the flowchart block or blocks.

The various features and processes described herein may be used independently of one another, or may be combined in various ways. All possible combinations and sub-combinations are intended to fall within the scope of this disclosure. In addition, certain methods or process blocks may be omitted in some implementations. The methods and processes described herein are also not limited to any particular sequence, and the blocks or states relating thereto may be performed in other sequences that are appropriate. For example, described blocks or states may be performed in an order other than that specifically described, or multiple blocks or states may be combined in a single block or state. The example blocks or states may be performed in serial, in parallel, or in some other manner. Blocks or states may be added to or removed from the described examples. The example systems and components described herein may be configured differently than described. For example, elements may be added to, removed from, or rearranged compared to the described examples.

It will also be appreciated that various items are illustrated as being stored in memory or on storage while being used, and that these items or portions thereof may be transferred between memory and other storage devices for purposes of memory management and data integrity. Alternatively, in other examples, some or all of the software modules and/or systems may execute in memory on another device and communicate with the illustrated computing systems via inter-computer communication. Furthermore, in some examples, some or all of the systems and/or modules may be implemented or provided in other ways, such as at least partially in firmware and/or hardware, including, but not limited to, one or more application-specific integrated circuits ("ASICs"), standard integrated circuits, controllers (e.g., by executing appropriate instructions, and including microcontrollers and/or embedded controllers), field-programmable gate arrays ("FPGAs"), complex programmable logic devices ("CPLDs"), etc. Some or all of the modules, systems, and data structures may also be stored (e.g., as software instructions or structured data) on a computer-readable medium, such as a hard disk, a memory, a network, or a portable media article to be read by an appropriate device or via an appropriate connection. The systems, modules, and data structures may also be transmitted as determined data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other examples. Accordingly, the present examples may be practiced with other computer system configurations.

While the methods and systems have been described in connection with specific examples, it is not intended that the scope be limited to the particular examples set forth, as the examples herein are intended in all respects to be illustrative rather than restrictive.

Unless otherwise expressly stated, it is in no way intended that any method set forth herein be construed as requiring that its operations be performed in a specific order. Accordingly, where a method claim does not actually recite an order to be followed by its operations or it is not otherwise specifically stated in the claims or descriptions that the operations are to be limited to a specific order, it is no way intended that an order be inferred, in any respect. This holds for any possible non-express basis for interpretation, including: matters of logic with respect to arrangement of steps or operational flow; plain meaning derived from grammatical organization or punctuation; and the number or type of examples described in the specification.

It will be apparent to those skilled in the art that various modifications and variations may be made without departing from the scope or spirit of the present disclosure. Other embodiments will be apparent to those skilled in the art from consideration of the specification and practices described herein. It is intended that the specification and example figures be considered as exemplary only, with a true scope and spirit being indicated by the following claims.

What is claimed is:

1. A non-transitory computer-readable medium storing instructions that, when executed, cause:

receiving content, wherein the content comprises audio and closed caption text;

determining text associated with at least a portion of the audio;

determining, based on a comparison of the determined text to at least a portion of the closed caption text, a synchronization point corresponding to one or more matching portions;

determining, based on the synchronization point, first timing data associated with the closed caption text and second timing data associated with the determined text;

determining, based on a comparison of the first timing data and the second timing data, a misalignment between the audio and the closed caption text; and realigning, based on the determined misalignment, the audio and the closed caption text.

2. The non-transitory computer-readable medium recited in claim 1, wherein the instructions that, when executed, cause realigning the audio and the closed caption text cause slowing down the audio.

3. The non-transitory computer-readable medium recited in claim 1, wherein the instructions that, when executed, cause realigning the audio and the closed caption text cause speeding up the audio.

4. The non-transitory computer-readable medium recited in claim 1, wherein the instructions that, when executed, cause realigning the audio and the closed caption text cause buffering the audio.

5. The non-transitory computer-readable medium recited in claim 1, wherein the instructions that, when executed, cause determining the text cause decoding, by a player based on an audio-to-text translation, the at least the portion of the audio by the player.

6. The non-transitory computer-readable medium recited in claim 1, wherein the instructions that, when executed, cause determining the text cause converting descriptive audio of the content to text.

7. The non-transitory computer-readable medium recited in claim 1, wherein the content comprises an audiovisual stream.

8. The non-transitory computer-readable medium recited in claim 1, wherein the closed caption text comprises decoded closed captions.

9. The non-transitory computer-readable medium recited in claim 1, wherein the closed caption text comprises one or more subtitles.

10. A system comprising:

a first computing device configured to send content; and a second computing device configured to:

receive the content, wherein the content comprises audio and closed caption text;

determine text associated with at least a portion of the audio;

determine, based on a comparison of the determined text to at least a portion of the closed caption text, a synchronization point corresponding to one or more matching portions;

determine, based on the synchronization point, first timing data associated with the closed caption text and second timing data associated with the determined text;

determine, based on a comparison of the first timing data and the second timing data, a misalignment between the audio and the closed caption text; and realign, based on the determined misalignment, the audio and the closed caption text.

11. The system recited in claim 10, wherein the second computing device is configured to realign the audio and the closed caption text by slowing down the audio.

12. The system recited in claim 10, wherein the second computing device is configured to realign the audio and the closed caption text by speeding up the audio.

13. The system recited in claim 10, wherein the second computing device is configured to realign the audio and the closed caption text by buffering the audio.

14. The system recited in claim 10, wherein the second computing device is configured to determine the text by decoding, based on an audio-to-text translation, the at least the portion of the audio.

15. The system recited in claim 10, wherein the second computing device is configured to determine the text by converting descriptive audio of the content to text.

16. The system recited in claim 10, wherein the content comprises an audiovisual stream.

17. The system recited in claim 10, wherein the closed caption text comprises decoded closed captions.

18. The system recited in claim 10, wherein the closed caption text comprises one or more subtitles.

19. A non-transitory computer-readable medium storing instructions that, when executed, cause:

receiving content, wherein the content comprises video, audio, and closed caption text;

determining, based on an audio-to-text conversion of at least a portion of the audio, text;

determining, based on a comparison of the determined text to at least a portion of the closed caption text, a delay; and buffering, based on the determined delay, at least one of the audio, the video, or the closed caption text.

20. The non-transitory computer-readable medium recited in claim 19, wherein the instructions, when executed, further cause:

outputting the buffered audio or the buffered video; and outputting the closed caption text.

21. The non-transitory computer-readable medium recited in claim 19, wherein the instructions, when executed, further cause synchronizing output of the buffered audio or the buffered video with output of the closed caption text.

22. The non-transitory computer-readable medium recited in claim 19, wherein the instructions that, when executed, cause determining the text cause decoding, by a player based on the audio-to-text translation of the at least the portion of the audio, the at least the portion of the audio.

23. The non-transitory computer-readable medium recited in claim 19, wherein the closed caption text comprises decoded closed captions.

24. The non-transitory computer-readable medium recited in claim 19, wherein the audio-to-text conversion comprises performing visual speech recognition on at least a portion of the video.

25. The non-transitory computer-readable medium recited in claim 19, wherein the content comprises an audiovisual stream.

26. The non-transitory computer-readable medium recited in claim 19, wherein the buffering facilitates alignment of the audio or the video with the closed caption text.

27. The non-transitory computer-readable medium recited in claim 19, wherein the closed caption text comprises one or more subtitles.

28. A system comprising:

a first computing device configured to send content; and a second computing device configured to:

receive the content, wherein the content comprises video, audio, and closed caption text;

determine, based on an audio-to-text conversion of at least a portion of the audio, text;

determine, based on a comparison of the determined text to at least a portion of the closed caption text, a delay; and buffer, based on the determined delay, at least one of the audio, the video, or the closed caption text.

29. The system recited in claim 28, wherein the second computing device is further configured to:

output the buffered audio or the buffered video; and output the closed caption text.

30. The system recited in claim 28, wherein the second computing device is further configured to synchronize output of the buffered audio or the buffered video with output of the closed caption text.

31. The system recited in claim 28, wherein the second computing device is configured to determine the text by decoding, based on the audio-to-text translation of the at least the portion of the audio, the at least the portion of the audio.

32. The system recited in claim 28, wherein the closed caption text comprises decoded closed captions.

33. The system recited in claim 28, wherein the audio-to-text conversion comprises performing visual speech recognition on at least a portion of the video.

34. The system recited in claim 28, wherein the content comprises an audiovisual stream.

35. The system recited in claim 28, wherein the buffering facilitates alignment of the audio or the video with the closed caption text.

36. The system recited in claim 28, wherein the closed caption text comprises one or more subtitles.

* * * * *